Inventor:
Joseph E. Femia,

United States Patent Office 3,523,708
Patented Aug. 11, 1970

1

3,523,708
DELAY ACTION DEVICE
Joseph E. Femia, Framingham, Mass., assignor to the United States of America as represented by the Secretary of the Army
Filed Jan. 7, 1969, Ser. No. 789,525
Int. Cl. B64d 17/38
U.S. Cl. 294—83          5 Claims

ABSTRACT OF THE DISCLOSURE

A delay action device for arming a parachute release that is being dropped lands and the force thereof extraction of an airdrop load from an aircraft which comprises a timing mechanism controlling the time during which a timer rod moves between a first position in which the timer rod opposes the unlatching of the parachute release and a second position which permits the unlatching of the parachute release when the load that is being dropped lands and the force trereof exerted on the parachute release mechanism during the airdrop relaxes.

The invention described herein may be manufactured, used, and licensed by or for the Government for governmental purposes without the payment to me of any royalty thereon.

This invention relates to a delay action device for use in conjunction with a parachute release to arm the latter after a preselected time interval following the extraction of an airdrop load from an aircraft.

When heavy loads of equipment or supplies are airdropped, there is a possibility that surface winds will cause the parachutes to drag or overturn the load with resulting damage thereto. Various means have been employed for preventing this. The most frequently used method is to interpose a parachute release mechanism between the parachutes and the load, the release mechanism being armed or set to release the parachutes from the load as soon as the load impacts the ground.

A parachute release mechanism for this purpose is described in Military Specification, MIL–R–43003B, Nov. 22, 1965, "Release, Cargo Parachute, 5000-Pound Capacity." This type of release operates to release the parachutes from a load when the load lands and the force thereof exerted on the release mechanism relaxes. This prevents the load from being dragged or overturned if surface winds are acting on the parachutes, pulling them laterally so as to apply a horizontal vector with respect to the load. During deployment of the parachutes at the beginning of the drop, however, there is a tendency for the load and parachutes to swing considerably and occasionally for the load to bounce, relaxing its force on the release mechanism, such that the release must be locked to prevent unintended operation until the parachute-load system achieves a stabilized condition for descent to avoid premature separation. Since the time required to achieve this condition is relatively constant and can be readily determined, a time delay unlocking or arming mechanism is used in this type of release.

The time-delay of the release mechanism described in the above-mentioned Military Specification operates pyrotechnically. These time-delay devices have operated reasonably well. However, they are relatively expensive because the cartridges require careful hand loading and they are not reusable. Also, in the event of a misfire, the release mechanism will fail to operate.

It is therefore an object of the present invention to provide a delay action device of an improved mechanical type for arming a parachute release mechanism to release the parachutes therefrom upon ground contact by the load connected thereto.

A further object of the invention is to provide a delay action device for arming a parachute release mechanism at a preselected time after deployment of the parachutes in an airdrop which can be used in repeated airdrops.

A still further object is to provide a relatively simple yet rugged delay action device for unlocking a parachute release mechanism at a preselected time after deployment of the parachutes in an airdrop preparatory to the disconnection of the parachutes from the load upon contact thereof with the ground.

Other objects and advantages will appear from the following description of two embodiments of the invention, and the novel features will be particularly pointed out hereinafter in connection with the appended claims.

In the accompanying drawings.

Figure 5:
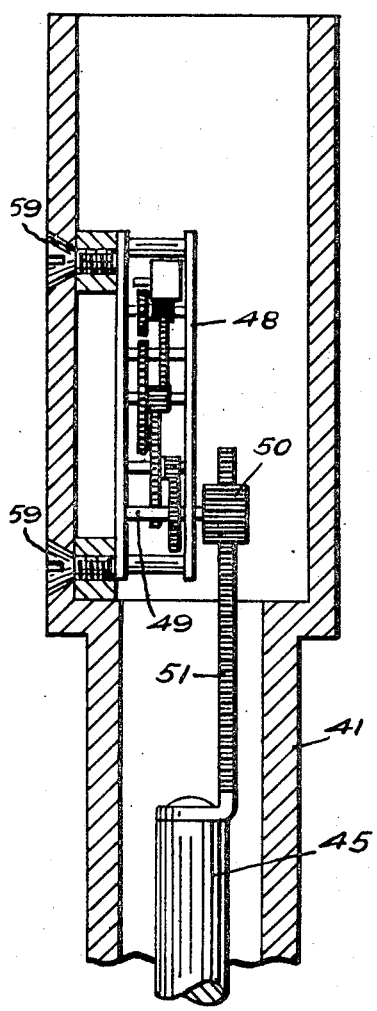

FIG. 4 is a side elevation view, partially in section, of one embodiment of the delay action device of the invention and a portion of the release mechanism with which the delay action device cooperates in carrying out its delay action function; and FIG. 5 is a side elevation, partially in section, of a second embodiment of the delay action device, with portions broken away, since these portions are similar to those shown in FIG. 4.

In the embodiment of the invention illustrated in FIGS. 1–4, a parachute release mechanism, represented generally by the numeral 10, comprises a housing assembly 11 to which is attached a yoke assembly 12, which is adapted for attachment of webbing or straps thereto for connecting the release mechanism to one or more parachutes employed in the airdropping of a load, the latter (not shown) being attached by means of webbing or straps (not shown) to a link assembly 13, which is connected to hook member 14 of the release mechanism. Hook member 14 is pivotably mounted on pivot pin 15 within the housing assembly between sideplates 16 and 17 thereof and near the base 18 of the housing assembly.

The base 18 of the housing assembly has an opening 19 therein through which hook 14 drops as it pivots on pivot pin 15 when the hook is released, permitting link assembly 13 to become detached from the release mechanism. One end of pivot pin 15 is journalled in an opening (not shown) in sideplate 16 while the other end thereof is journalled in an opening (not shown) in sideplate 17.

A movable arcuate catch member 20 is disposed within housing assembly 11 partially above and partially alongside of hook member 14. A notch 21 is provided in the concave surface of catch member 20 to engage a lip 22 on the free end of hook member 14 when the release mechanism is locked. A generally cylindrical stop pin 23 is mounted in a slot 24 in the convex surface of catch member 20 by pin 25. Stop pin 23 extends outwardly of the convex surface of catch member 20 through an opening 62 in sideplate 17 to the extreior of housing assembly 11 and is free to pivot with respect to catch member 20 about pin 25 within slot 24 for a purpose to be described. One end of catch member 20 is pivotally mounted on pin 27 which is journalled in opposed openings (not shown) in sideplates 16 and 17. The other end of catch member 20 carries a pin 28 mounted therein projecting slightly beyond each side of the catch member for a purpose to be described.

Catch member 20 is biased for clockwise pivotal movement about pin 27 by a tension spring 29. One end of spring 29 is attached to the catch member 20 by engagement with one of the projecting ends of pin 28 and the other end is fixed to the interior top portion of the housing assembly 11 by stud 30. Thus, the biasing force of spring 29 tends to swing catch member 20 clockwise about pin 27 and out of engagement with hook member 14.

A cocking lever 31 is pivotally mounted on pin 15 and has a lower end 32 thereof conformed to engage the other projecting end of pin 28 on catch member 20 upon countterclockwise rotation of the cocking lever 31 about pin 15. Thus, when the upper end 33 of cocking lever 31 is moved in a counterclockwise direction, the lower end 32 of the cocking lever 31 also moves in a counterclockwise direction and contacts pin 28 moving catch member 20 in a counterclockwise direction about pin 27 against the biasing force of spring 29. In this manner, the cocking lever 31 is used for locking the release mechanism with the link assembly 13 engaged in hook member 14. In this condition, a force applied to link assembly 13 which is greater than the biasing force being applied to catch member 20 by spring 29, for example, the weight of a load being airdropped, causes lip 22 of hook member 14 to bear on notch 21 with sufficient force to prevent clockwise movement of catch member 20 about pin 27 until such force applied to the link assembly is reduced or removed. However, during the time prior to the application of such force, for example, prior to stable deployment of a parachute system in support of a load through the release mechanism, premature releasing movement of the catch member must be prevented. This is accomplished by providing movable abutment means mounted on the exterior of housing assembly 11 to engage the free end of stop pin 23 until such time as the parachute-load system achieves a stable descent condition whereupon the abutment means is moved out of engagement with the end of stop pin 23 by a delay action device 40.

Having described the parachute release mechanism, I will now describe the delay action device of the present invention. In the embodiment thereof shown in FIGS. 1 to 4, the delay action device, which is represented generally by the numeral 40, comprises a hollow generally cylindrical housing 41 which is mounted on the lower portion of the exterior of housing assembly 11 immediately above the opening 26 therein and the free end of stop pin 23 extending therethrough. The upper end of housing 41 is provided with a removable cap 42 which is retained against loss by a tether 43. The lower end of housing 41 is provided with a cylindrical passage 44 therethrough in which an elongated cylindrical timer rod 45 is mounted for sliding movement longitudinally of said passage. Timer rod 45 is movable from a first position wherein the lower end 46 thereof extends below the lower end of housing 41 substantially perpendicular to stop pin 23 and in abutting relation with the free end thereof to a second position wherein timer rod 45 is moved upwardly into housing 41 whereby the lower end 46 of the timer rod is moved out of abutting relation with stop pin 23. A circumferential groove 47 is provided near the lower end 46 of the timer rod for a purpose to be described. An escapement type mechanical timer 48 is mounted on the upper end of timer rod 45 within housing 41 for movement with the timer rod within the housing. The stem 49 of timer 58 carries a pinion gear 50 which engages a rack 51 mounted on the interior side wall of housing 41 by screws 52 for a purpose to be described.

Movement of timer rod 45 and timer 48 is caused by a compression spring 53 mounted within housing 41 around timer rod 45 and extending between the bottom interior surface of housing 41 and the lower surface of timer 48 to thereby bias the timer rod toward its second position. The engagement of the pinion gear 50 on the timer stem 49 with rack 51 controls the speed of movement of the timer rod 45 and timer 48 by operation of the escapement mechanism of the timer. Thus, the time required for timer rod 45 to move from its first position to its second position under the influence of spring 53 is controlled by the timer 48.

A stop block 54 is mounted on the exterior of housing assembly 11 or may be formed integrally therewith directly opposite opening 26 to provide an abutment surface 55 aligned in close proximity to the lower end of timer rod 45 when the latter is in its first position to support said lower end when the free end of stop pin 23 bears upon said lower end as shown in FIG. 4. Stop block 54 is provided with an opening 56 therethrough which is aligned with the circumferential groove 47 in the lower end of timer rod 45. A safety pin 57 is provided for insertion in opening 56 to engage circumferential groove 47 to prevent movement of timer rod 45 prior to the time when the delay action device is to be activated. When safety pin 57 is withdrawn from stop block 54, it may be used to lock cocking lever 31 in its stored position as showning FIGS. 1 and 3 by inserting the safety pin 57 through an opening 58 provided therefor in the upper end 33 of the cocking lever 31 into an opening (not shown) provided therefor in side plate 17.

It will be apparent that the relative positions of the timer 48 and rack 51 can be reversed without changing the mode of operation of the device. This alternative construction is shown in FIG. 5 wherein the rack 51 is attached to the upper end of timer rod 45 and the timer 48 is mounted on the interior sidewall of the upper portion of housing 41 by means of screws 59. It will also be apparent that, in lieu of spring 53, the biasing of the timer rod 45 toward its second position may be accomplished by incorporating means such as a coil spring in timer 48 to apply a rotational bias to stem 49 which will in turn, be applied through pinion 50 and rack 51 to bias the timer rod 45 toward its second position.

Figure 3:
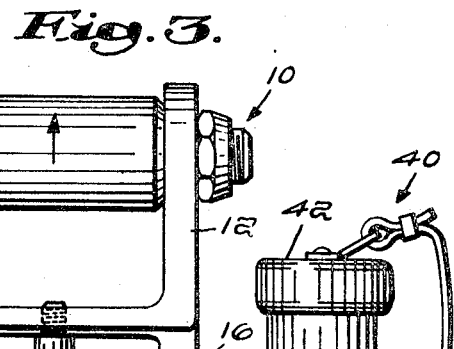
FIG. 3 is a side elevation view, partially in section, similar to FIG. 1, immediately following release of the load from the release mechanism after it has landed. This view shows the timer rod of the delay action device in the position to which it moves after passage of the preselected time interval following airdrop of the load, i.e. in the armed position.

The operation of the delay action device and the parachute release mechanism is carried out in the following described manner. To prepare for the airdropping of a load to which link assembly 13 is attached, the parachute release mechanism in open position, as shown in FIG. 3, is brought into the proximity of link assembly 13 and link assembly 13 is inserted in opening 19. Cap 42 is removed from the top of housing 41 either before or after insertion of sleeve 60 of link assembly 13 in opening 19. Hook member 14 is pivoted upward so that lip 22 thereof will be above notch 21 of catch member 20 and link assembly 13 will be engaged on hook member 14. Cocking lever 31 is then rotated counterclockwise, thus rotating catch member 20 counterclockwise due to contact of end 32 of cocking lever 31 with pin 28. Enough force must be applied by means of cocking lever 31 to overcome the biasing force of spring 29. The counterclockwise rotation of catch member 20 results in the withdrawal of cylindrically shaped pin 23 from the path of timer rod 45, thus preparing the way for the setting of the delay action device. With cap 42 removed from housing 41, a finger, such as the index finger of the hand, is inserted in housing 41 and timer 48 is forced in a downward direction, compressing spring 53 and causing timer rod 45 to move into its first position. When this has been accomplished, cocking lever 31 is released until pin 23 is forced against timer rod 45 by the biasing force of spring 29 and timer rod 45 is clamped between pin 23 and stop block 54 and cap 42 may be replaced on housing 41. The hook member 14 is now held latched in place ready to support the load attached to link assembly 13 when the load is airdropped by reason of the fact that the lip 22 is held within notch 21 of catch member 20 and will continue to be so held until pin 23 becomes free to move toward stop block 54, passing through the path of timer rod 45 after withdrawal movement of timer rod 45 to its second or armed position.

To prevent premature release of the parachute release mechanism, safety pin 57 is inserted through hole 56 and passed through a portion of groove 47 in timer rod 45, thus preventing any movement of the timer rod from its first position as long as the safety pin is in place. It is maintained thus until the load, together with its parachutes and parachute release mechanism, has been properly loaded into an aircraft and is considered ready for takeoff of the aircraft on an airdrop mission. Then the safety pin is removed and may be stored in any convenient location, but preferably is inserted in hole 58 so as to lock cocking lever 31 in place in the position thereof shown in FIGS. 1 and 3.

During the first stage of the airdrop mission, the biasing action of spring 29 maintains enough force on catch member 20 and, therefore, on pin 23 to produce sufficient friction on the surface of timer rod 45 to prevent its being withdrawn to its second position under the biasing force being applied to it by spring 53. However, when the load, together with its parachutes and parachute release mechanism, is discharged from the aircraft, the load is applied through link assembly 13 on hook member 14; and, since the force resulting from the load exceeds the biasing force of spring 29, the catch member 20 is caused to pivot slightly in a counterclockwise direction to the extent permitted by the clearance between the end of hook 14 and notch 21. This may take place in interrupted intervals during the first few seconds after the load is discharged from the aircraft because of bouncing of the load in the air. During this period of instability, the timer rod may be retracted intermittently toward its second or armed positon due to the intermittent application of friction thereto by pins 23 under the influence of catch member 20 and biasing spring 29. However, after the load stabilizes and becomes steadily applied through the release mechanism to the parachutes, the timer rod will proceed toward its second position and will be removed from the path of pin 23.

The timer is so designed and set that the timer rod will be withdrawn to its second position well before the load lands, but not before the load has had ample time to become stabilized in its fall. A period of about thirteen seconds of total travel time has been found to be satisfactory. Thus, with the timer rod retracted to its second position, when the load lands, the force which the load had been applying to the hook member 14 while in the air is removed, permitting the biasing force of spring 29 to cause the instantaneous clockwise rotation of catch member 20 sufficiently to permit hook member 14 to drop down through opening 19 as the parachutes, under the influence of surface winds, pull on the release mechanism and the inertia of the load causes the link assembly and load to be separated from the release mechanism, as shown by the arrows on the link assembly and the yoke assembly in FIG. 3.

Figure 1:
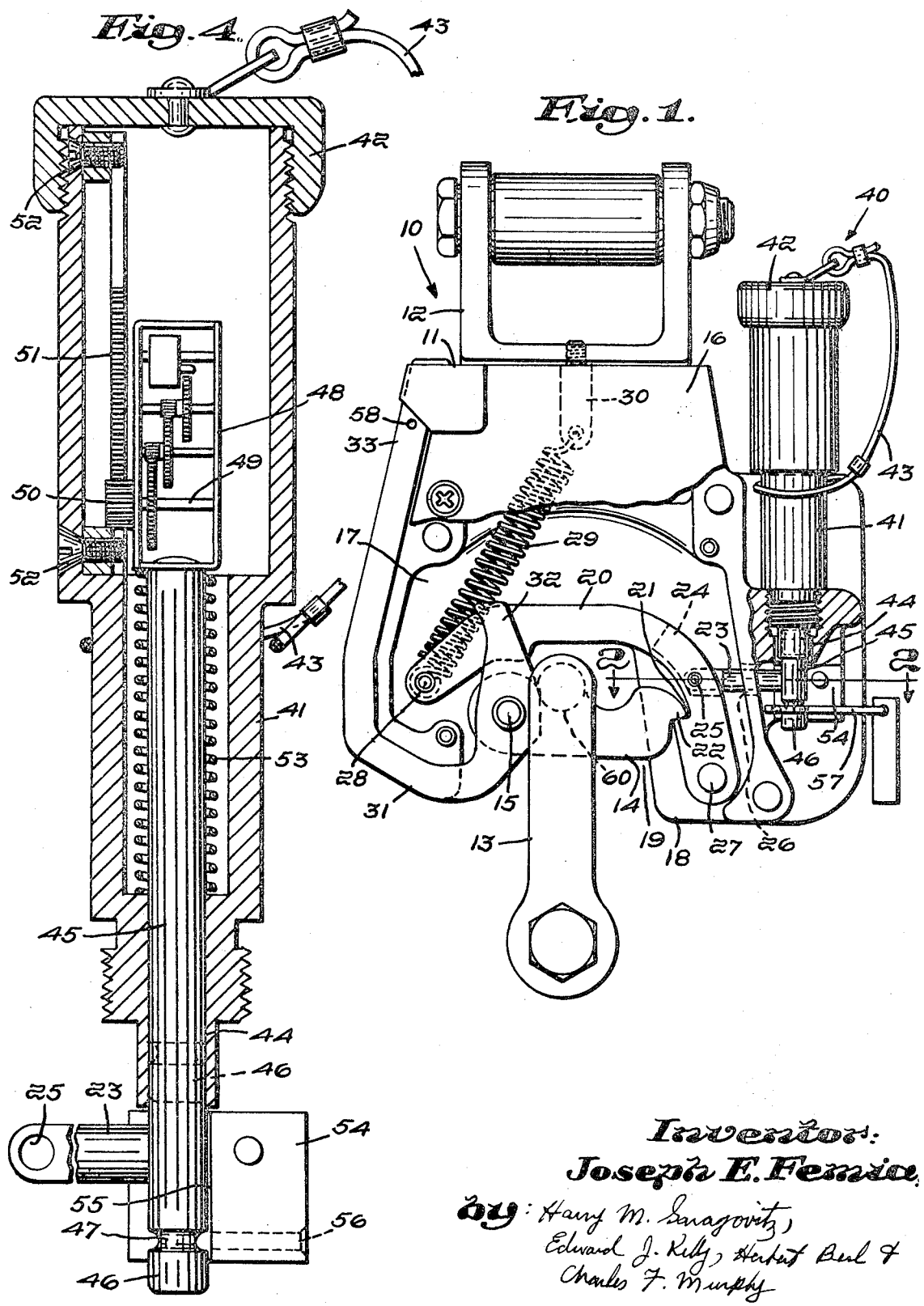
FIG. 1 is a side elevation view, partially in section, of parachute release mechanism including the delay action device of the present invention in the unarmed position, portions of one of the sideplates of the release mechanism being cut away to show the interior thereof.
Figure 2:
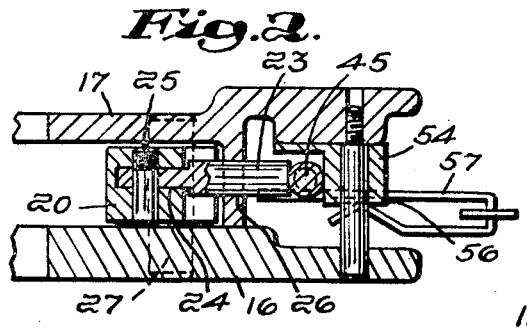
FIG. 2 is a horizontal section of the parachute release and delay action device, with portions of the parachute release broken away, taken along the line 2—2 of FIG. 1.

The operation of the modification of the delay action device shown in FIG. 5 is carried out similarly to that of the delay action device shown in FIGS. 1 through 4, the only difference being that the timer remains stationary while the rack is pushed downwardly in housing 41 to set the timer rod in its first position, thereby maintaining catch member 20 in its latching or locking position as shown in FIG. 1 and as described above with respect to the embodiment illustrated in FIGS. 1 through 4.

The herein described invention is useful in time-controlled arming of parachute release mechanisms. It has the advantages over prior time delay arming devices for parachute release mechanisms of being reusable time after time, of being as nearly defect-free and faultless in operation as any time delay device thus far used for arming parachute release mechanisms, and of being relatively less expensive than pyrotechnic type time delay arming devices which have been used by the military forces for arming parachute release mechanisms to a great extent during recent years.

It will be understood, of course, that various changes in the details, material and arrangements of parts which have bene herein described and illustrated in order to explain the nature of the invention, may be made by those skilled in the art within the principle and scope of the invention.

I claim:

1. In a release mechanism for releasably connecting a parachute to a load, said release mechanism having a pivoted hook member to which said load is attached, a movable catch member for engaging said hook member to prevent pivotal movement thereof, means biasing said catch member tending to move same out of engagement with said hook member, said hook member having means to prevent movement of said catch member so long as the load on said hook member exceeds said biasing force, a delay action device comprising a housing mounted on the body of said release mechanism, a timer rod slidably mounted within said housing for movement between a first position and a second position, means mounted within said housing biasing said timer rod toward said second position thereof, a timing mechanism mounted within said housing for controlling the speed at which said timer rod moves between said first position thereof and said second position thereof, and means carried by said catch member of said release mechanism for engaging said timer rod in said first position thereof when the load applied to said hook member is less than said biasing force on said catch member to thereby limit movement of said catch member and to prevent movement of said timer rod when the load applied to said hook member is less than said biasing force on said catch member whereby said catch member is prevented from moving out of engagement with said hook member until a load greater than said biasing force on said catch member has been applied to said hook member for the period of time necessary for said timer rod to move from said first position thereof to said second position thereof under the control of said timing mechanism.

2. In a release mechanism as in claim 1 wherein said timing mechanism is comprised of two elements, a first element comprising a rack and a second element comprising an escapement-type device having a directly connected stem and a pinion mounted on said stem in engagement with said first element, one of said elements being mounted on the inside wall of said housing and the other of said elements being mounted on a portion of said timer rod within said housing.

3. In a release mechanism as in claim 1 wherein said means biasing said timer rod to said second position thereof comprises a coil spring mounted concentrically with said timer rod and adapted to be compressed when said timer rod is moved to the first position thereof whereby said timer rod is biased toward the second position thereof.

4. In a release mechanism as in claim 3 wherein said housing is provided with a removable cover whereby upon removal of said cover, said timer rod may be manually displaced to said first position thereof thereby compressing said spring.

5. In a release mechanism as in claim 1 having removable means for locking said timer rod in said first position thereof, said means comprising a removable pin slidably mounted in stop means mounted on said release mechanism and engaging a recess provided therefor in said timer rod in said first position of said timer rod.

References Cited

UNITED STATES PATENTS

| | | | |
|---|---|---|---|
| 2,492,063 | 12/1949 | Quilter | 74—3.5 X |
| 2,665,163 | 1/1954 | Gross | 294—83 |

MILTON KAUFMAN, Primary Examiner

U.S. Cl. X.R.

74—3.5